United States Patent [19]
Bader

[11] 3,756,544
[45] Sept. 4, 1973

[54] AIRCRAFT POWER LOADING SYSTEM

[75] Inventor: Howard E. Bader, Long Beach, Calif.

[73] Assignee: McDonnell Douglas Corporation, Santa Monica, Calif.

[22] Filed: Nov. 22, 1971

[21] Appl. No.: 200,935

[52] U.S. Cl............. 244/137 R, 214/83.14, 214/84, 214/516
[51] Int. Cl.............................................. B64c 1/22
[58] Field of Search................... 214/84, 516, 38 C, 214/83.14, 518; 191/12.2 A; 104/279; 244/137 R

[56] References Cited
UNITED STATES PATENTS

| | | | |
|---|---|---|---|
| 2,873,502 | 2/1959 | Hodges et al. | 214/516 |
| 3,213,993 | 10/1965 | Long | 193/35 |
| 2,534,057 | 12/1950 | Pride | 214/65 |
| 1,773,087 | 8/1930 | Levin | 191/12.2 A |
| 3,099,097 | 7/1963 | Simmons | 37/19 |

*Primary Examiner*—Gerald M. Forlenza
*Assistant Examiner*—Robert Saifer
*Attorney*—Walter J. Jason, George W. Finch et al.

[57] ABSTRACT

A powered system for moving pallets and containers from a cargo door of an aircraft to a stowed position in an aircraft. The system includes powered rollers to move the pallets or containers laterally from the door into the aircraft and a power unit for moving the containers or pallet longitudinally in the aircraft along a track attached to the aircraft floor or deck. A coupling dolly on which the pallet or container is loaded is operatively associated with the power unit for movement thereby along the track. The dolly includes means to engage the track and means to secure the pallet or container to the dolly of the power unit for movement thereby.

6 Claims, 5 Drawing Figures

PATENTED SEP 4 1973 3,756,544

AIRCRAFT POWER LOADING SYSTEM

BACKGROUND OF THE INVENTION

For some time many methods of loading present and future cargo aircraft have been pursued. Systems such as disclosed in U. S. Pat. No. 3,612,316, designed in conjunction with new aircraft, have been developed to power cargo modules such as pallets and containers into the aircraft, locate them within the aircraft, and latch them to resist the anticipated loads encountered in flight. The advantages of these systems include improved loading and unloading times, reduced manpower and less damage to the aircraft. These systems when designed into new aircraft have no problem with interference with other systems above or below the floor of the aircraft. However, efforts to install these advanced cargo systems in aircraft whose floors were not designed with cargo systems in mind have met with failure because of the interference problem.

The end result is that in aircraft currently in use which were not designed for power movement of cargo, a crew of four or more cargo handlers must be employed to manhandle the pallets laterally into the aircraft and then longitudinally to the proper station within the aircraft. In some instances, the longitudinal movement of the pallet assemblies exceeds 100 feet. With normal conditions of the landing gear struts of an aircraft, the tilt on the floor may exceed 1°. When pallets up to 12,500 lbs. are being pushed up a 1 degree slope, it tends to be a tiring and time consuming operation while such pallets being moved in the other direction tend to "get away" and damage the aircraft or injure the cargo crew.

SUMMARY OF THE INVENTION

The present system is designed to be installed in the floor of existing cargo and cargo convertable aircraft which usually include omnidirectional movement means such as a ball mat or a plurality of omnidirectional rollers at the door area and rollers of some type over which it is possible to move loaded pallets in the longitudinal direction. The system includes powered rollers installed in the omnidirectional movement means to enable a single operator to move a loaded pallet from dock side laterally into the aircraft or vice-versa. Once the pallet assembly is in the aircraft, a power shuttle assembly is employed to move it longitudinally to the desired stow position or to remove it to the area where the powered rollers can be employed to move the pallet out the cargo door.

The power shuttle assembly includes three basic submodules, the first being a track assembly which is connected to the floor of the aircraft to provide guidance and restraint for the shuttle and a means for positive traction. The track is relatively thin in height so that it can be installed in an existing aircraft with little or no modification other than minor revision of the ball mats if they are the omnidirectional means used.

The second submodule is a shuttle dolly that provides the interface between the track assembly and the pallet assembly. The dooly includes a plurality of wheels which support and restrain the dolly to the track assembly. A plate within the dolly is controllably elevated as desired to engage the pallet and transfer tractive force thereto. The plate is normally supported by a pneumatic system so that it can conform to irregularities on the bottom of the pallet assembly while maintaining a relatively large contact area therebetween. Other means for elevating the plate can include mechanical or hydraulic systems or combinations of all three.

The third submodule is the power unit. This unit includes a controllable motor, a gear drive that engages the rack to the motor, a source of pneumatic pressure and associated valving and control components. The power unit is usually attached to the dolly by means which allow simple and speedy removal and replacement of the unit.

By using the present system it is possible to reduce the crew required to load or unload an aircraft from four or more to one individual who need not perform any of the heavy work now required. At the same time the safety aspects of the cargo loading or unloading operation are enhanced.

It is therefore an object of the present invention to reduce the manpower required to load or unload cargo from an aircraft.

Another object is to provide a power cargo loading system which can be installed in existing aircraft with a minimum of aircraft modifications.

Another object is to provide a power cargo loading system which adds only a minimum of onboard weight to the aircraft.

Another object is to provide a cargo loading system which is simple and safe to operate.

Another object is to provide a power loading system which can be installed in an aircraft at relatively low cost.

Another object is to provide a cargo loading system in which the most likely to fail portions thereof can be quickly and easily replaced thereby eliminating the need for standby loading crews.

These and other objects and advantages of the present invention will become apparent after considering the following detailed specification which covers a particular embodiment thereof in conjunction with the accompanying drawings.

BRIEF DESCRIPTION OF THE DRAWINGS

FIG. 4 is an end view of the power unit shown in FIG. 1; and

DESCRIPTION OF THE SHOWN EMBODIMENTS

Figure 1:
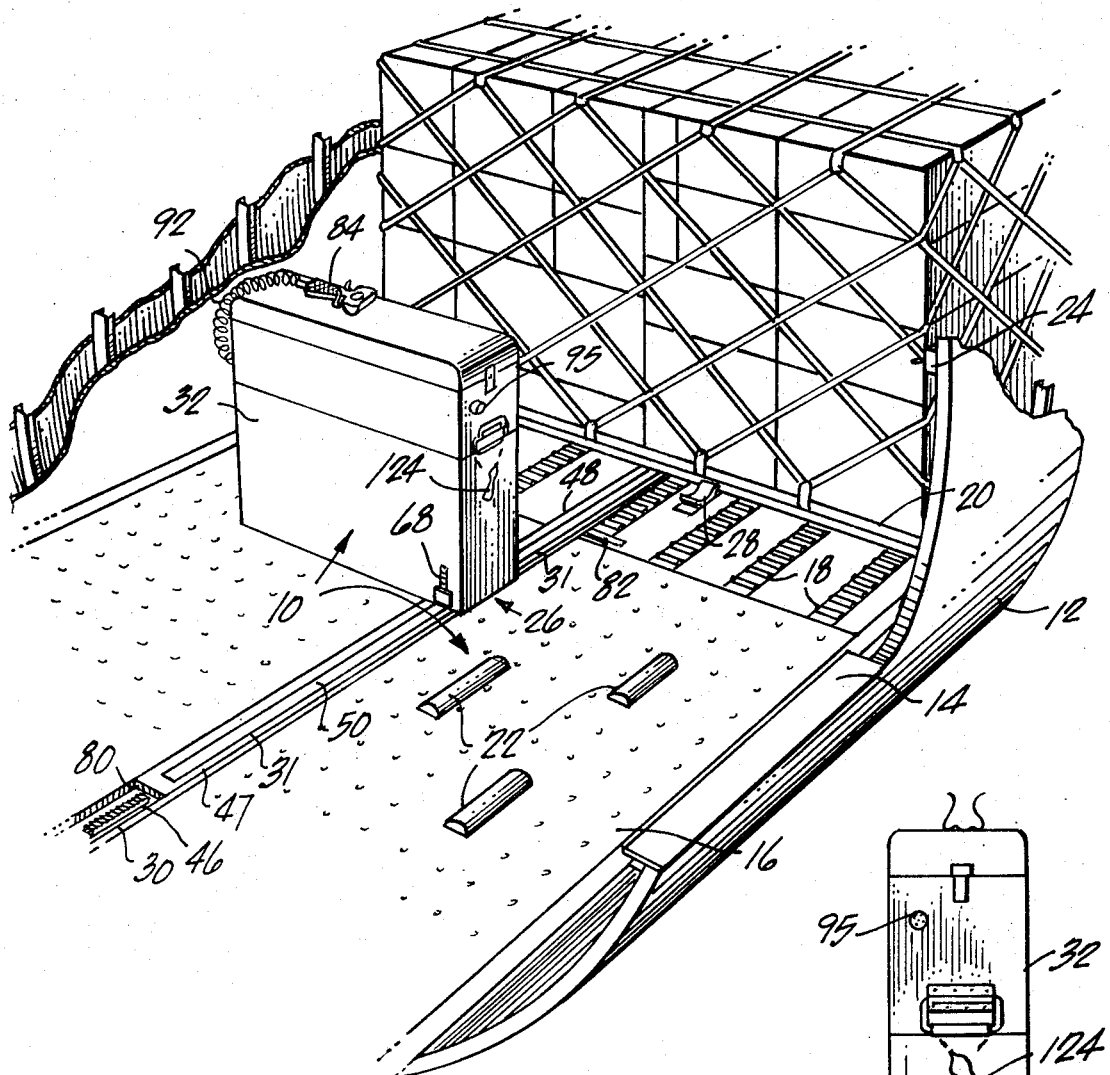
FIG. 1 is a perspective view of important portions of the present system installed in an aircraft.

Referring to the drawings more particularly by reference numbers, number 10 in FIG. 1 refers to a power loading system constructed according to the present invention. The system 10 is shown installed in an aircraft fuselage 12 having a doorway 14, an adjacent ball mat 16 and roller assemblies 18 to allow the movement of cargo pallets 20 in and out of the aircraft. The system 10 includes powered rollers 22 which are energized by means of a control 24 in the fuselage 12 to enable the movement of the pallets 20 laterally through the doorway 14. Such powered rollers 22 and controls 24 therefor are commercially available. The system 10 also includes a power shuttle assembly 26 which is used to move the cargo pallets 20 longitudinally to predetermined positions in the fuselage 12 where the pallets 20 can be retained by securing means such as the latch 28.

Figure 2:
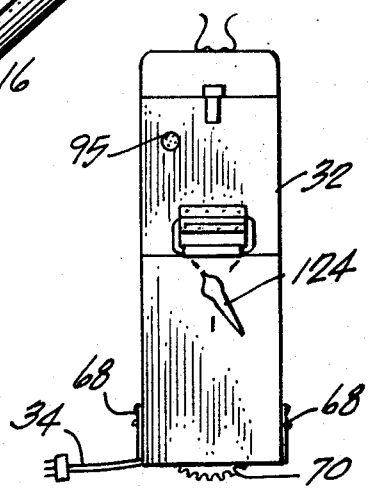
FIG. 2 is a cross-sectional view taken through the track and dolly of the present system.

The power shuttle assembly 26 includes a track 30, a dolly 31 and a power unit 32. The track 30 is mounted in the floor of the fuselage 12 and includes, as shown in FIG. 2, an upwardly facing U-shaped portion 33 into which the power cable 34 of the power unit 32 extends. The track 30 also includes two channel portions 36 and 37 connected by a bottom plate 38 which partially surrounds the dolly 31. The dolly 31 is movable on bearings in the form of wheels 40 and 42 which, in concert with the channel portions 36 and 37, restrain the dolly 31 to only longitudinal movements along the track 30. The dolly 31 has a raised underside 44 on its main body portion 45 which provides clearance for a linear gear or rack 46 which is attached to the plate 38 between the channel portions 36 and 37 of the track 30.

Figure 3:
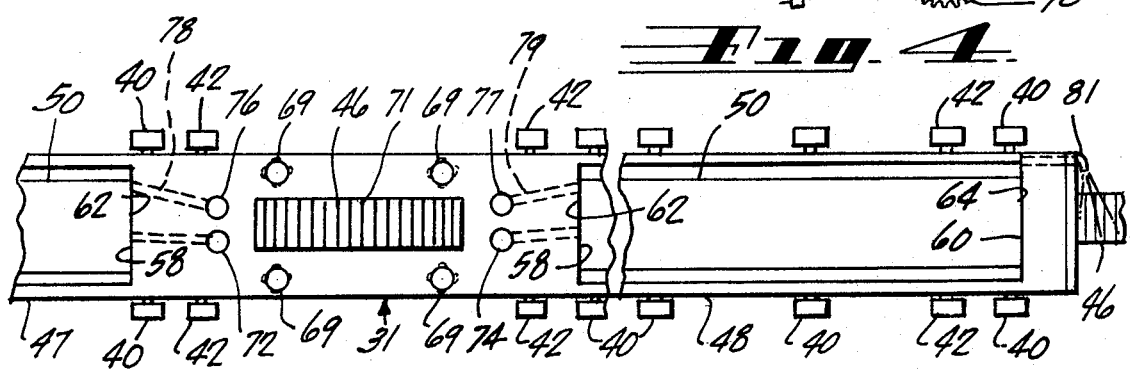
FIG. 3 is a broken top view of the dolly.
Figure 5:
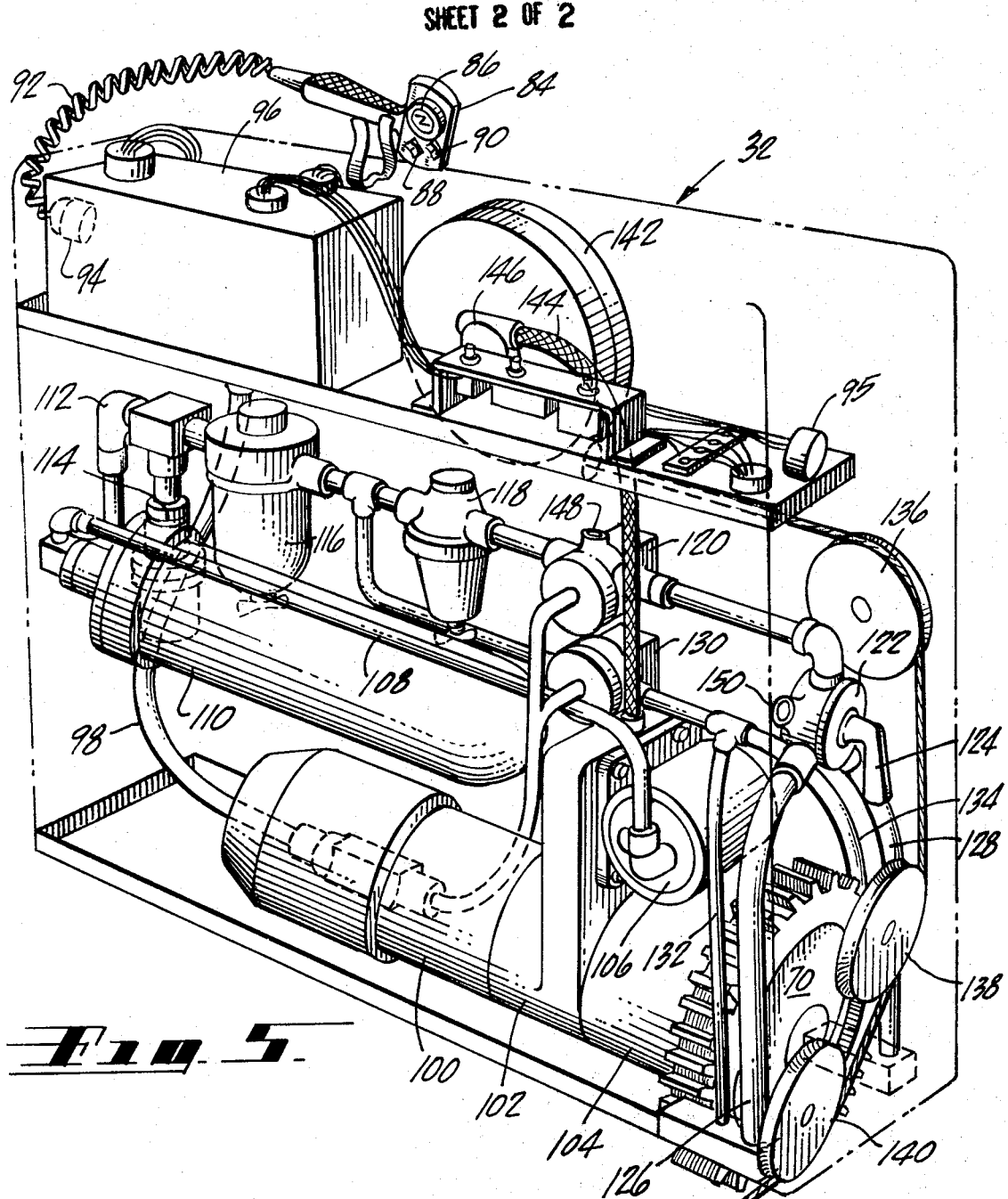
FIG. 5 is a perspective phantom view of the power unit of the present invention.
Figure 2:
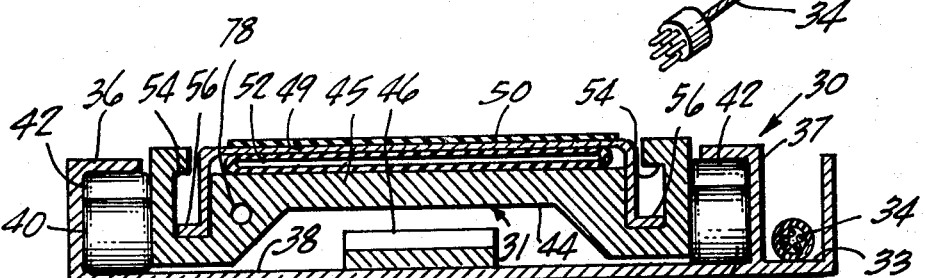

The dolly 31 also includes means to engage pallet assemblies on the opposite ends 47 and 48 thereof. The means on each end include a plate 49 having a friction pad 50 thereon which can be lifted into engagement with the bottom of a pallet 20 thereover by means such as the inflation of an airbag 52. The airbag 52 in a deflated condition is shown in FIG. 2 positioned between the main body portion 45 of the dolly 31 and the plate 49. When the airbag 52 is inflated by means to be discussed hereinafter, the plate 49 rises until downwardly facing abutment surfaces 54 on the dolly 31 engage upwardly facing abutment surfaces 56 on the plate 49. Of course in normal operation the raising of the plate 49 is also restricted by the pallet 20 thereon and it is only in the case where the airbag 52 is inflated when a loaded pallet 20 is not thereover, that the abutment surfaces 54 and 56 normally come into contact. As shown in FIG. 3, bearing surfaces 58 and 60 on the dolly 31 engage end bearing surfaces 62 and 64 on the plate 49 to restrain it from anything but vertical movement with respect to the dolly 31.

When it is desired to move a pallet 20 longitudinally in the airplane, the power unit 32 is connected to the dolly 31 by means such as the latches 68 and the power cord 34 thereof is engaged with an electrical power supply in the aircraft. When the power unit 32 is placed down on top of the dolly 31, a pinion gear 70 of the unit 32 extends through an opening 71 in the dolly 31 to engage the rack 46. At the same time, pneumatic connections are completed from the power unit 32 to the dolly 31 at ports 72 and 74 thereon for inflation of the airbags 52 and to ports 76 and 77 which are connected by lines 78 and 79 respectively to nozzles 80 and 81 at the ends of the dolly 31. The nozzles 80 and 81 are used to blow air across the rack 46 to assure that the track 30 does not become clogged with dirt. Once the power unit 32 has been latched to the dolly 31 and is engaged with the rack 46, a lock 82 for holding the dolly 31 at a desired position within the track 30 is released.

The power unit 32 is then operated by means of a pendant control 84 which includes a speed control 86, an airbag inflate/deflate control 88 and an optional on/off control 90 for the air nozzles 80 and 81. If the power unit 32 has been completely de-energized since the last operation thereof, the speed control 86 is first manipulated to move the power unit 32 and the connected dolly 31 back and forth a short distance. The speed control 86 is connected by means of an electrical line 92, a plug 94 or 95, a control box 96 and a line 98 to a reversable variable speed motor 100 such as are commercially available from the Breeze Corporation of Union, N.J. The motor 100 is connected through a gear box 102 and a torque limiter 104 to the pinion gear 70. The motor 100 when not energized maintains the pinion gear 70 stationary. When the motor 100 is energized in a predetermined direction by the control 86, it causes the pinion gear 70 to drive the power unit 32 and dolly 31 in a corresponding direction.

An air compressor 106 is connected to the gear box 102 and it is driven by the motor 100 when ever the power unit 32 moves back and forth along the track 30. The compressor 106 supplies compressed air through a line 108 to an air reservoir 110 from which the air can be controllably connected to the airbags 52 by an air line 112 in which is included a pressure relief valve 114, a filter 116, a pressure regulator 118, a solenoid valve 120 and a manual directional and relief valve 122. The power unit 32 need move only a relatively short distance before the air compressor 106 can supply sufficient pressure to inflate an airbag 52.

Once the air pressure has been built up in the air reservoir 110, the power unit 32 is moved so that one or the other ends 47 or 48 of the dolly 31 are under the pallet 20 to be moved. The handle 124 of the valve 122 is then moved to point generally in the direction of the end 47 or 48 whose airbag 52 is to be inflated. The valve 122 with its handle positioned as shown in FIG. 4 will enable air to pass through the left airbag line 126 to inflate the airbag 52 in the end 47 while the handle position shown in FIG. 1 will allow inflation of the airbag 52 in the other end 48 by way of the right airbag line 128. The control 88 on the pendant 84 is then moved to its inflate position which causes an electrical signal to be sent through lines 92 and 98 to the solenoid valve 120 which responds by allowing air to flow through the filter 116, the pressure regulator 118 and the valve 122 to inflate the selected airbag 52.

When the airbag 52 has been inflated, the pad 50 on the associated plate 49 engages the underside of the pallet 20 thereover. The speed control 86 is then moved so that the power unit 32 and dolly 31 move the pallet 20 in the desired direction. During this time should electrical power to the power unit 32 fail, the solenoid valve 120 is preferably of the type to either remain in a closed position or move to the inflate position so the airbag 52 stays inflated to maintain engagement between the shuttle 26 and the pallet 20. The motor 100 through release of the speed control 86 or upon loss of electrical power, stops moving to thereby restrain the pallet 20 from further movement.

As the power unit 32 and dolly 31 are moving the pallet 20, the reservoir 110 receives a continuing supply of compressed air from the compressor 106. Once a predetermined pressure has been reached, a valve 130 can be opened to allow a restricted flow of air from the reservoir 110 and filter 116 through lines 132 and 134 to the nozzles 80 and 81 to blow dirt out of the track 30 as the dolly 31 passes thereover. The valve 130 can be operated either by the predetermined pressure or electrically by means of the optional control 90. If for some reason the air compressor 106 fills the reservoir 110 with a predetermined maximum pressure, the relief valve 114 relieves all further pressure increase.

As the power unit 32 moves along the track 30, the power cord 34 thereof is played out or retrieved from the U-shaped portion 33 of the track 30 by means of pulleys 136, 138 and 140 and a cable reel 142 which may be of any suitable construction. The cable reel 142 is shown powered from the gear box 102 by a flexible drive 144 and a friction clutch 146 although other drive means including springs are feasable. The cable reel 142 is used to assure that the power cable 34 is always in a predetermined, tension condition so that it remains within the U-shaped portion 33 of the track 30 and in no case coils up to interfere with the operation of the power shuttle 26.

When the pallet 20 has been moved to the position desired, the control 88 is moved to its deflate position which sends an electrical signal to the solenoid valve 120, causing it to bleed the air out of the inflated airbag 52 through the relief port 148 thereof. This causes the pad 50 to disengage the pallet 20 so the dolly 31 can then be moved to a new position to move another pallet 20.

Once all the pallets 20 have been moved to the desired position by the power shuttle 26, the power unit 32 can be removed from the aircraft for use in another aircraft or to reduce the weight of the aircraft. This is done by turning the handle 124 of the valve 122 until it points to the downward position which opens a relief port 150 enabling any pressure in either airbag 52 to escape. If it is desired to completely de-energize the power unit 32, the control 88 is moved to the inflate position which enables the air in the reservoir 110 to also vent out through the port 150. The lock 82 is then engaged to hold the dolly 31 in the desired accessible position and the latches 68 and the power cable 34 are disconnected to allow the removal of the power unit 32 from the dolly 31. It is contemplated that the unit 32 may or may not be removed from the aircraft depending on the operational condition encountered in service and whether any one particular mode of operation proves to be more advantageous.

Thus there has been shown and described a novel aircraft power loading system which fulfills all the objects and advantages sought therefor. Many changes, modifications, variations, and other uses and applications of the subject system will, however, become apparent to those skilled in the art after considering the specification and the accompanying drawings. All such changes, modifications, alterations and other uses and applications which do not depart from the spirit and scope of the invention are deemed to be covered by the invention which is limited only by the claims which follow.

What is claimed is:

1. A system for moving cargo in an aircraft having a roller floor, said system including a power shuttle assembly comprised of:
   a track assembly positioned longitudinally in the roller floor of the aircraft including a rack;
   a dolly assembly adapted to be movable along said track assembly, said dolly assembly including means for predeterminately, frictionally engaging beneath the cargo which include a plate member restrained to limited vertical movement with respect to said dolly assembly, an upwardly facing friction pad on said plate member, and an airbag in position beneath said plate member to raise said plate member and said friction pad when inflated; and
   a power unit including means for removable attachment to said dolly assembly including means for establishing pneumatic communication therebetween, a pinion gear for positive engagement with said track assembly rack, a reversable variable speed electric motor, an electrical power cable for conducting electrical energy to said electric motor, means to transfer torque between said pinion gear and said electric motor so that said electric motor can drive said power unit with respect to the aircraft so said dolly assembly can be controllably moved along said track assembly, means to maintain a predetermined tension on said power cable as said power unit moves with respect to the aircraft, means for supplying pressurized gas, and valve means, said valve means including a solenoid valve having an inlet port connected to said supply means, an outlet port for connection to said airbag and a vent port, said solenoid valve when energized being capable of controllably opening a passageway between said inlet port and said outlet port, and controllably opening a passageway between said outlet port and said vent port, said solenoid closing said outlet port when de-energized. pg,16

2. The system defined in claim 1 wherein said dolly assembly includes:
   opposite end portions, each end including said frictional means for extending under the cargo and for controllably frictionally engaging therewith; and
   a central portion between said opposite end portions adapted for engagement with said power unit.

3. The system defined in claim 2 wherein said valve means include:
   a manual valve connected to said solenoid valve output port, said manual valve having a first position for opening a passageway from said solenoid valve output port to said frictional means in one of said opposite end portions, and a second position for opening a passageway from said solenoid valve output port to said frictional means in the other of said opposite end portions.

4. The system defined in claim 1 including:
   powered rollers positioned in the floor of the aircraft and spaced from said track assembly;
   control means for said powered rollers whereby said powered rollers can be used to move cargo at generally right angles to said track assembly to facilitate lateral movement of the cargo within the aircraft.

5. The system defined in claim 1 including:
   a remote control device; and
   an electrical cable for connecting said remote control device to said power unit so that the operation of said control unit can be controlled thereby, said remote control device including a directional speed control for said motor and a solenoid valve control.

6. The system defined in claim 1 wherein said means for supplying pressurized gas include:
   an air compressor; and
   an air reservoir connected to receive compressed air from said air compressor and to supply said compressed air to said valve means.

* * * * *